United States Patent

Nakazawa et al.

Patent Number: 5,133,899
Date of Patent: Jul. 28, 1992

[54] STABILIZER COMPOSITION FOR CHLORINE-CONTAINING POLYMERS AND PROCESS FOR PREPARATION THEREOF

[75] Inventors: Tadahisa Nakazawa, Tokyo; Masahide Ogawa, Shibata; Shoji Shoji, Tsuruoka; Seizi Wakaki, Tsuruoka; Choichi Abe, Tsuruoka, all of Japan

[73] Assignee: Mizusawa Industrial Chemicals, Ltd., Tokyo, Japan

[21] Appl. No.: 590,819

[22] Filed: Oct. 1, 1990

[30] Foreign Application Priority Data

Oct. 4, 1989 [JP] Japan .................. 1-257916

[51] Int. Cl.$^5$ .................................. C08K 3/34
[52] U.S. Cl. ....................... 252/400.3; 528/490; 524/399; 524/401; 524/400
[58] Field of Search ............ 502/408; 252/400.3 APS; 528/490; 524/399, 401, 400

[56] References Cited

U.S. PATENT DOCUMENTS

| | | | |
|---|---|---|---|
| 3,382,199 | 5/1968 | Scullin | 252/400.3 |
| 3,535,249 | 10/1970 | Larson | 252/400.3 |
| 3,816,342 | 6/1974 | Plank et al. | 502/68 |
| 3,830,751 | 8/1974 | Stapfer et al. | 252/400.3 |
| 4,060,508 | 11/1977 | Sugahara et al. | 252/400.3 |
| 4,242,251 | 12/1980 | Aishima et al. | 525/426 |
| 4,686,255 | 8/1987 | Erwied et al. | 252/400.3 |
| 5,004,776 | 4/1991 | Tadenuma et al. | 524/450 |

FOREIGN PATENT DOCUMENTS 56-47926 10/1982 Japan .

Primary Examiner—Deborah L. Kyle
Assistant Examiner—Valerie Fee
Attorney, Agent, or Firm—Sherman & Shalloway

[57] ABSTRACT

Disclosed to a stabilizer composition for a chlorine-containing polymer, which comprises a zeolite type stabilizer; calcium hydroxide or magnesium hydroxide, a metal soap type stabilizer and perchloric acid as indispensable components.

The stabilizer composition is obtained by adding a metal soap type stabilizer to a mixture of a zeolite type stabilizer and calcium hydroxide or magnesium hydroxide under attrition to cover the mixture with the metal soap type stabIlizer at a high efficiency, and adding perchloric acid to the covered mixture.

In the stabilizer composition of the present invention, the initial discoloration, which is a fatal defect of the conventional zeolite type stabilizer for a chlorine-containing polymer, can be prevented, and a sufficient hydrogen chloride-capturing capacity is exerted and a high heat stability is attained without occurrence of bleeding.

16 Claims, 1 Drawing Sheet

STABILIZER COMPOSITION FOR CHLORINE-CONTAINING POLYMERS AND PROCESS FOR PREPARATION THEREOF

BACKGROUND OF THE INVENTION (1) Field of the Invention

The present invention relates to a stabilizer composition for a chlorine-containing polymer and a process for the preparation thereof. More particularly, the present invention relates to an inorganic stabilizer composition comprising a zeolite as a main stabilizer component and a process for the preparation thereof.

(2) Description of the Related Art

When a chlorine-containing polymer, for example, a vinyl chloride resin, is exposed to light, dehydrochlorination is caused in the molecule chain, and decomposition and discoloration are caused. Various stabilizers and stabilizer compositions have been proposed and widely used for stabilizing vinyl chloride resins against this thermal decomposition.

Japanese Examined Patent Publication No. 58-18939 teaches that an aluminosilicate of a type A zeolite structure having a predetermined ion exchange capacity is incorporated as a heat stabilizer in a chorine-containing polymer.

Japanese Unexamined Patent Publication No. 61-34042 teaches that a zinc salt of an organic acid and a metal salt of a halogen oxyacid are incorporated together with an aluminosilicate of a zeolite crystal structure into a halogen-containing resin.

A zeolite type stabilizer is advantageous in that the stabilizer can be easily incorporated in a chlorine-containing polymer and bleeding is not caused in the resulting composition, and the stabilizer is cheap. However, at the initial stage after the incorporation, the chlorine-containing polymer tends to be discolored to some extent, and under ordinary application conditions, the heat stabilizing effect is still insufficient.

Accordingly, a zeolite type stabilizer is not used as a main stabilizer component of a stabilizer composition for a chlorine-containing polymer, though it is commercially used as a subsidiary stabilizer component.

It is considered that the reason why the zeolite is still insufficient for the heat stabilization of a chlorine-containing polymer is that the content of a metal component effective for capturing chlorine is not sufficiently high. Furthermore, it is considered that occurrence of discoloration at the initial stage after the incorporation is due to the presence of the above-mentioned metal component, as in case of other inorganic stabilizers. Accordingly, in case of zeolite type stabilizers, as in case of other inorganic stabilizers, it is difficult to simultaneously attain a sufficient heat stabilizing effect and an effect of preventing discoloration at the initial stage.

SUMMARY OF THE INVENTION

It is therefore a primary object of the present invention to provide an inorganic stabilizer composition for a chlorine-containing polymer, which comprises a zeolite type stabilizer as a main type stabilizer and has a sufficiently high heat stabilizing action and a controlled tendency of discoloration at the initial stage, and a process for the preparation of this stabilizer composition.

Another object of the present invention is to provide a stabilizer composition which has an excellent dispersion stability in a chlorine-containing polymer and a controlled bleeding tendency and does not cause environmental pollution at the time of molding or use of a chlorine-containing polymer, and a process for the preparation thereof.

In accordance with one aspect of the present invention, there is provided a stabilizer composition for a chlorine-containing polymer, which comprises a zeolite type stabilizer, calcium hydroxide or magnesium hydroxide, a metal soap type stabilizer and perchloric acid as indispensable components.

In accordance with another aspect of the present invention, there is provided a process for the preparation of a stabilizer composition for a chlorine-containing polymer, which comprises mixing a zeolite type stabilizer in the powdery state with fine particulate clacium hydroxide or magnesium hydroxide and then mixing the mixture with a metal soap type stabilizer, or mixing the zeolite type stabilizer intimately with fine particulate calcium hydroxide or magnesium hydroxide and a metal soap type stabilizer, and adding and mixing perchloric acid into the obtained powdery mixture.

The zeolite type stabilizer has a zeolite type crystal structure in which an aluminosilicate comprising an alkali metal component and/or an alkaline earth metal component as the metal component is incorporated. The metal component present in the ion-exchangeable form in this crystal structure exerts functions of capturing, absorbing and neutralizing hydrogen chloride generated from the chlorine-containing polymer by decomposition thereof. Furthermore, the alkali metal component and/or the alkaline earth metal component is present in the form of an aluminosilicate, and therefore, the degree of discoloration at the initial stage is lower than in the case where the metal component is present in the form of a hydroxide or the like, but discoloration deemed to be due to formation of a complex with the chlorine-containing polymer is caused to a perceptible degree.

The first characteristic feature of the present invention is that this zeolite type stabilizer is used in combination with calcium hydroxide and/or magnesium hydroxide. As pointed out hereinbefore, the zeolite type stabilizer is still insufficient in the hydrogen chloride-capturing property, but if the zeolite stabilizer is combined with calcium hydroxide or magnesium hydroxide, the hydrogen chloride-capturing property is prominently improved and also the durability of the heat stability is prominently improved. In order to prevent the initial discoloration, it is important to use calcium hydroxide or magnesium hydroxide in combination with the zeolite type stabilizer. When the hydroxide alone is used, the hydroxide-incorporated polymer composition is discolored (red discoloration) to such an extent that decolorization is impossible.

The second characteristic feature of the present invention is that perchloric acid is added to the mixture of the zeolite stabilizer and calcium hydroxide or magnesium hydroxide. The zeolite type stabilizer and calcium hydroxide or magnesium hydroxide tend to cause discoloration while forming a slightly reddish complex with the chlorine-containing polymer. On the other hand, perchloric acid forms a blue or green complex with the chlorine-containing polymer. Since there is a relation of complementary color between this complex and the reddish complex, if perchloric acid is used in combination with the zeolite type stabilizer and calcium hydroxide or magnesium hydroxide, the initial discoloration can be prevented by decolorization.

However, if perchloric acid is mixed with the zeolite type stabilizer and calcium hydroxide or magnesium hydroxide, a gelatinous product is formed by the reaction caused among them. It is very difficult to uniformly and finely disperse the mixture in the chlorine-containing polymer, and the function of the stabilizer is not exerted.

As shown in examples given hereinafter, in a molded article comprising a polyvinyl chloride sheet and a polyurethane foam, in general, the polyvinyl chloride is readily deteriorated by an amine component. Since perchloric acid is contained in the stabilizer composition of the present invention, the deterioration by the amine component is prevented and an amine resistance is attained.

The third characteristic feature of the present invention is that a metal soap type stabilizer is contained in addition to the above-mentioned components. The metal soap type stabilizer per se is a stabilizer for a chlorine-containing polymer, but in the composition of the present invention, the metal soap type stabilizer exerts an unexpected valuable function of preventing occurrence of the above-mentioned gelatinous product-forming reaction between perchloric acid with the zeolite type stabilizer and calcium hydroxide or magnesium hydroxide. Therefore, according to the present invention, there is provided a stabilizer composition in which perchloric acid is contained in the form of a water-containing salt crystal without forming a gelatinous product and also the zeolite and calcium hydroxide or magnesium hydroxide are stably contained without any change. Moreover, the stabilizer composition of the present invention is advantageous in that the composition can be handled easily and can be easily dispersed in a chlorine-containing polymer.

It is sufficient if the metal salt type stabilizer is present together with the zeolite type stabilizer and calcium hydroxide or magnesium hydroxide when perchloric acid is added. In general, the zeolite type stabilizer, calcium hydroxide or magnesium hydroxide and the metal soap type stabilizer are mixed in advance, or preferably, the zeolite type stabilizer is first mixed with calcium hydroxide or magnesium hydroxide and the metal soap is then added to the mixture, to form a covering of the metal soap, and then, perchloric acid is incorporated into the mixture.

DETAILED DESCRIPTION OF THE PREFERRED EMBODIMENTS

Figure 1:
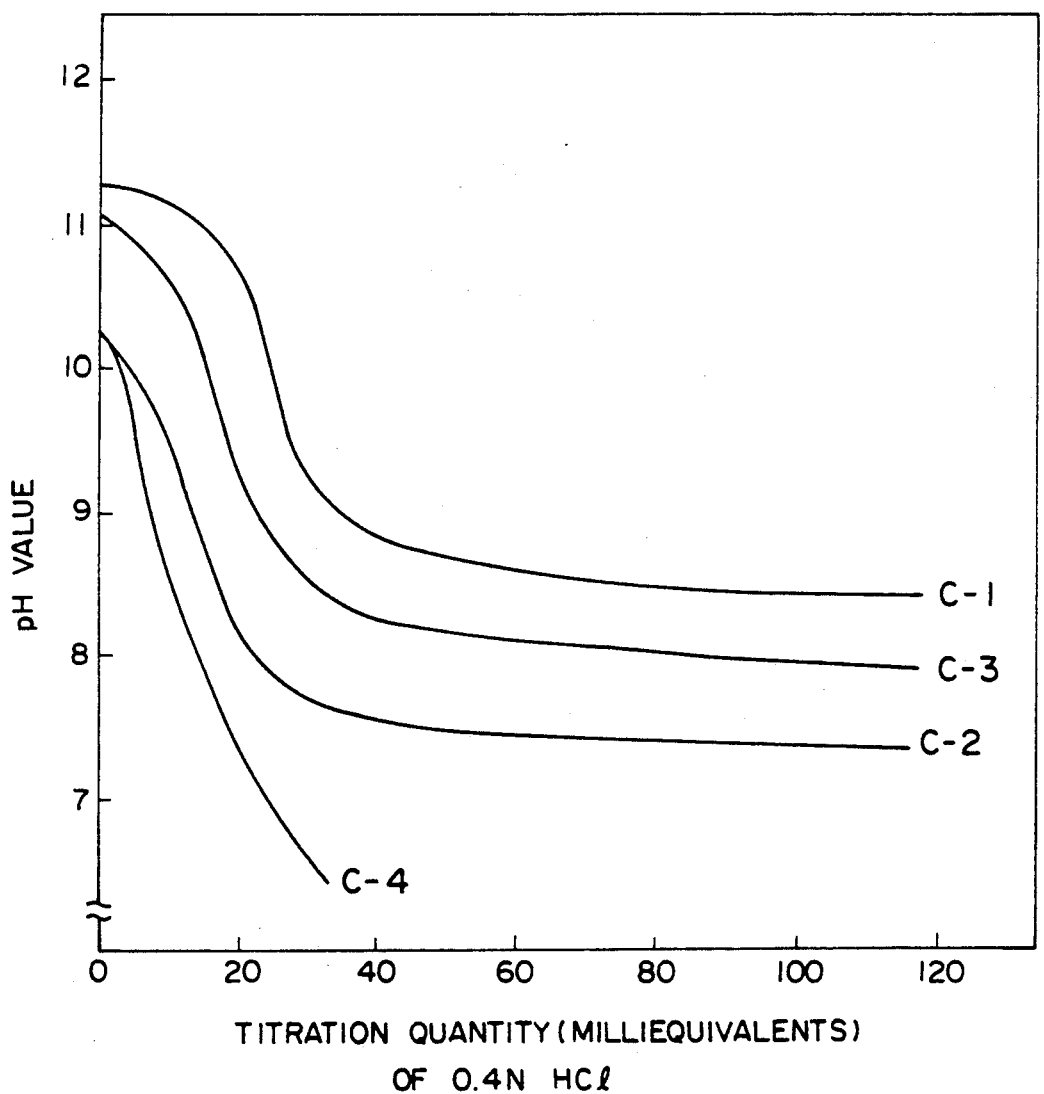
FIG. 1 shows hydrochloric acid titration curves of aqueous dispersions of type A zeolites to be used in the present invention, in which curves C-1, C-2 and C-3 show the results obtained with respect to type Na-A and type Ca-A zeolites used in the present invention and curve C-4 shows the results obtained with respect to type Ca-A zeolite as a referential example.

The present invention will now be described in detail.

Zeolite Type Stabilizer

Various type zeolites differing in the crystal structure, such as not only type A zeolite, type X zeolite, type Y zeolite and type T zeolite but also chabazite, mordenite, erionite and clinoptilplite can be used as the zeolite. However, from the viewpoint of the hydrogen chloride-capturing property, type A zeolite having an ion exchange capacity is especially preferably used.

Type A zeolite as the alkali metal aluminosilicate has the following chemical composition when the alkali metal is Na:

| Chemical Composition (% by weight) | | |
| --- | --- | --- |
| | General Range | Preferred Range |
| $SiO_2$ | 35–45 | 36–40 |
| $Al_2O_3$ | 25–35 | 27–33 |
| $Na_2O$ | 13–20 | 14–19 |
| ignition loss | 1–18 | 15–17 |
| $Fe_2O_3$ | below 3 | below 1 |
| CaO | below 3 | below 0.1 |
| MgO | below 3 | below 0.1 |

Ideally, this alkali metal aluminosilicate has a composition represented by the formula of $Na_{12}(Al_{12}Si_{12}O_{48})\cdot 1.5-30H_2O$, and the sodium component on the left side of the formula is a component capable of capturing hydrogen chloride.

This A type zeolite has in general an X-ray diffraction pattern shown in the following table.

| X-Ray Diffraction Pattern | |
| --- | --- |
| Spacing d (KX) | Relative Intensity (I/In) |
| 12.440 | 85.3 |
| 8.750 | 58.5 |
| 7.132 | 48.3 |
| 5.5345 | 41.6 |
| 4.3708 | 17.8 |
| 4.1106 | 60 |
| 3.720 | 95.8 |
| 3.421 | 33 |
| 3.2995 | 81.4 |
| 2.9857 | 100 |
| 2.9098 | 24.6 |
| 2.7526 | 27.2 |
| 2.8270 | 70.4 |
| 2.5129 | 13.6 |
| 2.4661 | 11.0 |

Preferably, the alkali metal aluminosilicate used has substantially the same X-ray diffraction pattern as that shown in the above table. However, according to the process for the synthesis of the alkali metal aluminosilicate, the relative intensity of each diffraction peak changes to some extent, that is, generally within ±30%, especially within ±20%. Also such an alkali metal aluminosilicate can be advantageously used for attaining the objects of the present invention.

The type A zeolite has a hydrochloric acid-capturing capacity (C) of at least 3 ml/g, especially 5 to 10 ml/g.

Among A type zeolites, one having sodium as the alkali metal is especially preferably used, but up to 70 mole %, especially up to 60 mole %, of $Na_2O$ may be substituted by a polyvalent metal such as calcium, magnesium or zinc.

The A type zeolite used in the present invention preferably has a hydrochloric acid titration curve as shown in FIG. 1. In FIG. 1, the titration amount (milli-equivalents) of HCl based on 100 g of the zeolite anhydride is plotted on the abscissa, and the pH value of the system is plotted on the ordinate. From FIG. 1, it is seen that the zeolite preferably used in the present invention has a curved portion of a large gradient, that is, a portion of large reduction of the pH value, at the initial stage of the titration and a curved portion of a small gradient, that is, a portion of small reduction of the pH value, at the subsequent stage of the titration. The maximum pH value reduction gradient ($R_{max}$) determined from the tangential line of the maximum gradient portion of the titration curve of FIG. 1 in the type A zeolite used in the present invention is generally −0.1 to −0.7 pH/meq HCl, especially −0.2 to −0.5 pH/meq HCl, based on 100 g of the zeolite, and the continuous pH value reduction gradient ($R_{main}$) determined from the tangential line of the subsequent small gradient portion is generally −0.001 to −0.07 pH/meq HCl, especially −0.005 to −0.04 pH/meq HCl, based on 100 g of the zeolite.

Calcium Hydroxide and Magnesium Hydroxide

Known powdery calcium hydroxide or magnesium hydroxide can be used in the present invention, but in view of the hydrogen chloride-capturing property and the dispersibility in a chlorine-containing polymer, calcium hydroxide or magnesium hydroxide in the fine particulate form having a median diameter smaller than 20 μm, especially smaller than 10 μm, based on the volume is preferably used. These hydroxides can be used singly or in combination.

Metal Soap Type Stabilizer

All of metal soaps customarily used as the stabilizer for chlorine-containing polymers can be used in the present invention. For example, there can be used salts of saturated and unsaturated higher fatty acids having 12 to 22 carbon atoms, especially 14 to 18 carbon atoms, with metals of Groups I, II, III and IV of the Periodic Table. Ca, Ba, Mg and Zn salts of the above-mentioned fatty acids, especially palmitic acid, stearic acid, oleic acid, lauric acid, coconut oil fatty acid and palm oil fatty acid, are preferably used as the metal salt. These metal salts can be used singly or in the form of mixtures of two or more of them.

Perchloric Acid

Industrially available perchloric acid having a concentration of 50 to 75% is used as the perchloric acid. Although this industrial 14 available product contains water, it is considered that this water is fixed in the form of a 2.5 hydrate ($HClO_4 \cdot 2.5H_2O$) at the drying step.

Composition

The stabilizer composition of the present invention comprises a zeolite type stabilizer as the main component, and in general, the composition comprises 0.5 to 1.7, parts by weight, especially 0.8 to 1.45 parts by weight, of calcium hydroxide or magnesium hydroxide, 0.05 to 0.4 part by weight, especially 0.15 to 0.3 part by weight, of a metal soap type stabilizer and 0.1 to 0.4 part by weight, especially 0.12 to 0.3 part by weight, of perchloric acid per part by weight of the zeolite type stabilizer. If the amount of calcium hydroxide or magnesium oxide is too small and below the above-mentioned range, the composition is insufficient in the hydrogen chloride-capturing property and the durability of the heat stability, and if the amount of calcium hydroxide or magnesium hydroxide exceeds the above-mentioned range, the effect of preventing the initial discoloration is often insufficient. If the amount of perchloric acid is too small and below the above-mentioned range, the effect of preventing the initial discoloration is insufficient, and if the amount of perchloric acid exceeds the above-mentioned range, the heat stability is poorer than that attained when the amount of perchloric acid is within the above-mentioned range. If the amount of the metal soap type stabilizer is too small and below the above-mentioned range, the effect of controlling the reaction of perchloric acid with the zeolite or hydroxide is reduced and if the amount of perchloric acid exceeds the above-mentioned range, troubles such as bleeding are caused and the characteristics of the stabilizer composition as the inorganic stabilizer are often lost.

Known additives to chlorine-containing polymers can be added to the stabilizer composition of the present invention according to known recipes. For example, lubricants such as paraffin, chlorinated paraffin, polyethylene wax, polypropylene wax and microcrystalline wax, various dyes and pigments, fillers and plasticizers can be added to the stabilizer composition of the present invention.

The stabilizer composition of the present invention can be used in the form of a powdery stabilizer, or it can be formed into a particulate stabilizer, for example, a spherical or granular stabilizer, having a particle size of 0.05 to 1.0 mm according to known procedures.

The present invention will now be described in detail with reference to the following examples that by no means limit the scope of the invention.

EXAMPLE 1

This example illustrates the novel stabilizer composition for a chlorine-containing polymer according to the present invention and the process for the preparation thereof.

Preparation of Zeolite Type Stabiliers

Na-A type zeolite (Mizukariser ® DS supplied by Mizusawa Kagaku) and Ca-A type zeolite (Mizukariser ® ES or ESS supplied by Mizusawa Kagaku) powdery stabilizers were prepared according to the following procedures.

Finely divided silicic acid having a particle size and chemical composition shown in Table 1, which was obtained by acid-treating acid clay produced at Nakajo, Niigata Prefecture, Japan, one kind of the smectite clay mineral, was used as the $SiO_2$ starting material. Commercially available sodium aluminate (comprising 21.0% of $Na_2O$ and 18.8% of $Al_2O_3$) and caustic soda were used as the $Na_2O$ and $Al_2O_3$ starting materials, respectively.

TABLE 1

| Particle Size Distribution | | | | | |
| --- | --- | --- | --- | --- | --- |
| Particle Size (μ) | 0–1 | 1–2 | 2–3 | above 3 | |
| (%) by weight | 49.3 | 37.3 | 13.0 | 0.4 | |
| Chemical Composition | | | | | |
| Component | Ignition loss | $SiO_2$ | $Al_2O_3$ | $Fe_2O_3$ CaO MgO | |
| Weight Ratio (%) | 3.93 | 94.18 | 1.05 | 0.15 0.49 0.10 | |

An aqueous slurry comprising the respective components in such amounts that the $Na_2O/SiO_2$ molar ratio was 1.2, the $SiO_2/Al_2O_3$ molar ratio was 2.0 and the $H_2O/Na_2O$ molar ratio was 35 was prepared by using the foregoing starting materials. Then, the slurry was heated at 95° C. and reaction was conducted for 3 hours with stirring to form crystals of an alkali alumino silicate (type A zeolite). Then, aging reaction was carried out at 95° C. for 2 hours with stirring. The reaction mixture was filtered and the solid was washed with water to obtain a type 4A zeolite cake. Then, the cake was dried at 110° C. and pulverized by an atomizer to form an Na-A type zeolite stabilizer (Mizukariser® DS).

Separately, the obtained zeolite cake was thrown into a solution of calcium chloride and a stirring treatment was carried out for 2 hours to effect ion exchange with a calcium metal ion. Then, the mixture was filtered and the solid was washed with water and dried to obtain a Ca-Na type zeolite stabilizer (Mizukariser® ES or ESS).

The properties of the obtained zeolite type stabilizers are shown in Table 2.

with stirring and sufficiently blended homogeneously to obtain a powdery mixture.

The obtained powdery mixture was dried at 100° to 130° C., lightly pulverized according to need and classified to obtain a powdery stabilizer composition of the present invention.

In case of sample H-3, when the aqueous solution containing 70% by weight of perchloric acid was added, the powder was partially aggregated, and in case of sample H-4, the powder was entirely aggregated and homogeneous mixing was difficult.

The chemical compositions and powder characteristics of the powdery stabilizer compositions of the present invention prepared according to the above-mentioned process and the comparative stabilizer compositions are shown in Table 3.

From the test results shown in Table 3, it is seen that

TABLE 2

| Sample No. | Mizukariser R | $Na_2O$ content (%) | CaO content (%) | Average Particle size (um) | pH Value | Hydrochloric Acid-Capturing Rate (ml/g) |
| --- | --- | --- | --- | --- | --- | --- |
| C-1 | DS | 17.1 | — | 2.15 | 11.2 | 9.72 |
| C-2 | ES | 6.3 | 9.2 | 2.2 | 9.8 | 3.53 |
| C-3 | ESS | 8.3 | 8.1 | 2.2 | 10.0 | 3.74 |
| C-4[*1] | — | 2.1 | 14.4 | 2.23 | 9.1 | 1.21 |

Note
[*1] referential example

Preparation of Stabilizer Compositions

The Na-A type zeolite (Mizukariser® DS) or Ca-A type zeolite (Mizukariser® ES or ESS) powder was mixed under high-speed stirring with calcium hydroxide having an average particle size of 2.8 μm or magnesium hydroxide having an average particle size of 2.6 μm in a super-mixer (supplied by Kawada Seisakusho) at a mixing ratio shown in Table 3, and a metal soap (Stabinex® NT-C3, BA-2, NT-MG or NT-Z2 supplied by Mizusawa Kagaku) was added and the mixture was sufficiently attrited. Then, an aqueous solution containing 70% of perchloric acid was added to the mixture the powdery stabilizer composition of the present invention does not contain any aggregated mass and has a very excellent dispersibility in a chlorine-containing resin.

Samples H-3 and H-4 were not uniformly dispersed in polyvinyl chloride by light pulverization and classification conducted after the drying.

From the results of the X-ray diffractometry, it was confirmed that perchloric acid in the stabilizer composition of the present invention is present without forming a perchloric acid salt by reaction with other compounds.

TABLE 3

| | Example 1 | | | | | | | |
| --- | --- | --- | --- | --- | --- | --- | --- | --- |
| Sample No. | S-1 | S-2 | S-3 | S-4 | S-5 | S-6 | S-7 | S-8 |
| Chemical Composition (parts by weight) of Stabilizer Composition | | | | | | | | |
| Na-A type zeolite (Mizukariser DS) | 1.0 | | | 1.0 | 1.0 | 1.0 | 1.0 | 1.0 |
| Ca-A type zeolite (Mizukariser ES) | | 1.0 | | | | | | |
| Ca-A type zeolite (Mizukariser ESS) | | | 1.0 | | | | | |
| calcium hydroxide | 0.91 | 1.10 | 1.10 | 0.87 | 0.91 | 1.05 | | 0.54 |
| magnesium hydroxide | | | | | | | 1.18 | |
| calcium stearate (Stabinex NT-C3) | 0.18 | 0.20 | 0.20 | | | | 0.18 | 0.36 |
| barium stearate (Stabinex BA-2) | | | | 0.13 | | | | |
| magnesium stearate (Stabinex NT-MG) | | | | | 0.23 | | | |
| zinc stearate (Stabinex NT-Z2) | | | | | | 0.18 | | |
| perchloric acid (75% aqueous solution) | 0.27 | 0.30 | 0.30 | 0.26 | 0.27 | 0.27 | 0.27 | 0.23 |
| partial ester of fatty acid with pentaerythritol | 0.18 | 0.20 | 0.20 | 0.17 | 0.23 | | 0.18 | 0.18 |
| Powder Characteristics | | | | | | | | |
| aggregates | not found | not found | not found | not found | not found | not found | not found | not found |
| X-ray diffractometry[*1] | not found | not found | not found | not found | not found | not found | not found | not found |
| dispersibility in polyvinyl chloride[*2] | 1 | 1 | 1 | 1 | 1 | 1 | 1 | 1 |

| | Example 1 | | | | Comparison | | | |
| --- | --- | --- | --- | --- | --- | --- | --- | --- |
| Sample No. | S-9 | S-10 | S-11 | S-12 | H-1 | H-2 | H-3 | H-4 |
| Chemical Composition (parts by weight) of Stabilizer Composition | | | | | | | | |
| Na-A type zeolite (Mizukariser DS) | | 1.0 | 1.0 | 1.0 | 1.0 | 1.0 | 1.0 | 1.0 |

TABLE 3-continued

| | 1 | 2 | 3 | 4 | 5 | 6 | 7 | 8 |
|---|---|---|---|---|---|---|---|---|
| Ca-A type zeolite (Mizukariser ES) | 1.0 | | | | | | | |
| Ca-A type zeolite (Mizukariser ESS) | | | | | | | | |
| calcium hydroxide | 1.40 | 0.91 | 0.91 | 0.91 | 0.33 | 1.86 | 1.0 | 1.09 |
| magnesium hydroxide | | | | | | | | |
| calcium stearate (Stabinex NT-C3) | 0.15 | | 0.18 | 0.27 | 0.13 | 0.29 | 0.045 | |
| barium stearate (Stabinex BA-2) | | | | | | | | |
| magnesium stearate (Stabinex NT-MG) | | | | | | | | |
| zinc stearate (Stabinex NT-Z2) | | 0.27 | | | | | | |
| perchloric acid (70% aqueous solution) | 0.30 | 0.14 | 0.14 | 0.36 | 0.20 | 0.42 | 0.27 | 0.27 |
| partial ester of fatty acid with pentaerythritol | 0.20 | | 0.18 | 0.18 | 0.13 | 0.29 | 0.18 | 0.18 |
| Powder Characteristics | | | | | | | | |
| aggregates | not found | not found | not found | not found | not found | not found | found | found |
| X-ray diffractometry[*1] | not found | not found | not found | not found | not found | not found | found | found |
| dispersibility in polyvinyl chloride[*2] | 1 | 1 | 1 | 1 | 1 | 1 | 3 | 5 |

Note
[*1] X-ray diffractometry
Whether or not a peak attributed to a salt of perchloric acid was found in the X-ray diffraction diagram was checked.
[*2] Dispersibility in polyvinyl chloride A composition comprising 100 parts by weight of a paste type vinyl chloride resin, 70 parts by weight of dioctyl phthalate, 5 parts by weight of epoxidized soybean oil and 5 parts by weight of the sample stabilizer were uniformly mixed, and air contained in the mixture was removed under a reduced pressure. The obtained compound was coated in a thickness of about 1 mm on a stainless steel sheet and placed in a furnace maintained at 200° C. for 5 minutes to gelatize the coating layer and obtain a resin sheet. The dispersion state of the sample in the sheet was evaluated according to the following scale:

1: completely dispersed
2: several fine blobs of undispersed sample
3: many fine blobs of undispersed sample
4: several lumps of undispersed sample
5: many lumps of undispersed sample

EXAMPLE 2

By using the novel stabilizer composition of the present invention, a soft polyvinyl chloride sheet, a rigid polyvinyl chloride plate and a sheet from a paste type vinyl chloride resin were prepared, and the properties of the stabilizer composition as the stabilizer for a chlorine-containing resin were evaluated.

Evaluation of Stabilizer Composition in Soft Polyvinyl Chloride Sheet

In order to evaluate the heat stabilizing effect in a chlorine-containing resin composition containing the powdery stabilizer composition of the present invention, a soft polyvinyl chloride sheet was prepared according to he following recipe and molding method.

| Recipe | |
|---|---|
| Vinyl chloride resin (polymerization degree: 1050) | 100 parts by weight |
| Dioctyl phthalate | 50 parts by weight |
| Epoxidized soybean oil | 2 parts by weight |
| Diphenyltridecyl phosphite | 0.5 part by weight |
| Sample (Table 5) | 1.5 parts by weight |

Molding Method

The above composition was kneaded at 150° C. for 5 minutes by a roll mill to obtain a uniform sheet having a thickness of 0.5 mm.

Test Methods

Heat Stability:

The sample sheet was set on a glass sheet and placed in a gear type heat aging tester maintained at 190° C., and at every interval of 15 minutes, the sample sheet was taken out and the discoloration degree was visually judged.

Adhesion to Roll:

When the composition was kneaded by the roll mill, the adhesion of the composition to the roll was examined.

Foaming Degree:

The sample sheet was heat-pressed at a temperature of 200° C. under a pressure of 100 kg/cm$^2$ for 5 minutes, and the sheet was taken out and the foaming state was visually judged.

Each evaluation was conducted according to the standard shown in Table 4.

TABLE 4

| Test Item | Grading | | | | |
| | 1 | 2 | 3 | 4 | 5 |
|---|---|---|---|---|---|
| Heat Stability | not discolored | slightly yellowed | yellowed | browned | blackened and decomposed |
| Adhesion to Roll | no adhesion | slight adhesion | fair adhesion | considerable adhesion but peeled from roll | considerable adhesion and not peeled from |
| Foaming Degree | no foaming | slight fine foams | fine foams | large foams | violent foaming |

The obtained test results are shown in Table 5.

From the test results shown in Table 5, it is seen that the powdery stabilizer composition of the present invention has excellent performances as a stabilizer for a soft vinyl chloride resin.

It also is seen that samples H-1 and H-2 not satisfying the composition requirements of the present invention is defective in that discoloration is conspicuous and the heat stability is poor, as shown in Table 5, though these samples have a good dispersibility in a vinyl chloride resin, as shown in Table 3.

TABLE 5

| Test Item | Example 2-1 | | | | | | | Comparative Example | |
|---|---|---|---|---|---|---|---|---|---|
| Sample No. | S-1 | S-2 | S-6 | S-7 | S-8 | S-10 | S-11 | H-1 | H-2 |
| Heat Stability | | | | | | | | | |
| after 15 minutes' heating | 1 | 1 | 1 | 1 | 1 | 1 | 1 | 1 | 2 |
| after 30 minutes' heating | 2 | 1 | 1 | 1 | 1 | 1 | 2 | 2 | 2 |
| after 45 minutes' heating | 2 | 2 | 2 | 2 | 2 | 1 | 2 | 3 | 3 |
| after 60 minutes' heating | 2 | 2 | 2 | 3 | 2 | 2 | 3 | 3 | 4 |
| after 90 minutes' heating | 3 | 3 | 3 | 3 | 3 | 3 | 3 | 4 | 4 |
| after 120 minutes' heating | 3 | 3 | 3 | 4 | 3 | 4 | 4 | 5 | 5 |
| Adhesion to Roll | 1 | 1 | 1 | 1 | 1 | 1 | 1 | 1 | 2 |
| Foaming Degree | 1 | 1 | 1 | 1 | 1 | 1 | 1 | 3 | 2 |

Evaluation of Stabilizer Composition in Rigid Polyvinyl Chloride Sheet

As in the case of the above-mentioned soft polyvinyl chloride sheet, in order to evaluate the heat stabilizing effect in a chlorine-containing resin composition containing the powdery stabilizer composition of the present invention, a rigid polyvinyl chloride sheet was prepared according to the following recipe and molding method.

| Recipe | |
|---|---|
| Vinyl chloride resin (polymerization degree: 800) | 100 parts by weight |
| Stearic acid monoglyceride | 0.3 part by weight |
| Low-molecular-weight polyethylene wax | 0.7 part by weight |
| Sample (Table 6) | 2.0 parts by weight |

For reference, rigid polyvinyl chloride sheets having a composition described below were prepared by using a lead type stabilizer.

| | (parts by weight) | |
|---|---|---|
| | Reference Example E-1 | Reference Example E-2 |
| Vinyl chloride resin (polymerization degree: 800) | 100 | 100 |
| Stearic acid monoglyceride | 0.3 | 0.3 |
| Low-molecular-weight polyethylene wax | 0.3 | 0.3 |
| Tribasic lead sulfate | 0.2 | — |
| Lead stearate | 1.8 | 0.5 |
| Sample (S-2) | — | 1.5 |

Molding Method

The above composition was kneaded at a temperature of 160° C. for 7 minutes by using a roll mill to form a homogeneous mixture having a thickness of 0.4 mm. The kneaded mixture was heat-pressed at a temperature of 180° C. under a pressure of 150 kg/cm² for 5 minutes to obtain a rigid polyvinyl chloride sheet having a thickness of 1 mm.

Test Methods

Heat Stability:

The sample sheet was hung in a gear type heat aging tester maintained at a temperature of 190° C. At every interval of 15 minutes, the sample was taken out and the discoloration degree was visually judged.

Adhesion to Roll:

At the roll-kneading step, the degree of adhesion of each composition to the roll was examined.

As in case of the above-mentioned soft polyvinyl chloride sheet, each evaluation was conducted according to the standard shown in Table 4. The obtained test results are shown in Table 6.

TABLE 6

| Test Item | Example 2-2 | | | | | | Comparative Example | Referential Example 2 | |
|---|---|---|---|---|---|---|---|---|---|
| Sample No. | S-1 | S-2 | S-6 | S-9 | S-10 | S-12 | H-2 | E-1 | E-2 |
| Heat Stability | | | | | | | | | |
| after 15 minutes' heating | 2 | 2 | 2 | 2 | 2 | 2 | 3 | 2 | 2 |
| after 30 minutes' heating | 3 | 2 | 2 | 3 | 2 | 3 | 4 | 2 | 3 |
| after 45 minutes' heating | 3 | 3 | 3 | 3 | 3 | 4 | 4 | 3 | 3 |
| after 60 minutes' heating | 4 | 4 | 3 | 4 | 3 | 4 | 5 | 4 | 4 |
| after 75 minutes' heating | 4 | 4 | 4 | 4 | 5 | 5 | — | 5 | 4 |
| Adhesion to Roll | 1 | 1 | 1 | 2 | 1 | 2 | 2 | 1 | 1 |

From the test results shown in Table 6, it is seen that the powdery stabilizer composition of the present invention has excellent performances as a stabilizer for a rigid vinyl chloride resin. As is apparent from the results obtained in Referential Example 2, the powdery stabilizer composition can be used in combination with an other stabilizer.

Evaluation of Stabilizer Composition Sheet Prepared by Using Paste Type Vinyl Chloride Resin In order to evaluate the heat stabilizing effect of the of 120° C., and the state of discoloration of the polyvinyl chloride resin sheet by thermal deterioration and changes (curing and cracking) other than the change of the hue were examined. As in case of the soft polyvinyl chloride sheet, the evaluation was conducted according to the standard shown in Table 4. The obtained results are shown in Table 7.

TABLE 7

| | Sample No. | | | | | | Comparative Example 3 | |
|---|---|---|---|---|---|---|---|---|
| | Example 2-3 | | | | | | | |
| Test Item | S-1 | S-2 | S-6 | S-7 | S-10 | S-11 | H-1 | H-3 |
| Heat Stability and Hue | | | | | | | | |
| after 100 hours' heating | 2 | 2 | 2 | 2 | 2 | 2 | 2 | 3 |
| after 200 hours' heating | 2 | 2 | 2 | 2 | 2 | 2 | 3 | 3 |
| after 300 hours' heating | 3 | 3 | 3 | 3 | 3 | 3 | 4 | 4 |
| after 400 hours' heating | 3 | 3 | 3 | 3 | 4 | 4 | 4 | — |
| Changes of State | | | | | | | | |
| after 100 hours' heating | no change | no change | no change | no change | no change | no change | no change | no change |
| after 200 hours' heating | no change | no change | no change | no change | no change | no change | no change | slight curing |
| after 300 hours' heating | no change | no change | no change | no change | no change | no change | no change | cracking |
| after 400 hours' heating | no change | no change | no change | no change | slight curing | slight curing | curing | — | powdery stabilizer composition of the present invention in a chlorine-containing resin composition, especially a composite molded article formed by casting and contacting a polyurethane foam on and with a sheet composed of a chlorine-containing sheet, a polyvinyl chloride sheet/polyurethane foam composite molded article was prepared according to the following recipe and molding method.

| Recipe | |
|---|---|
| Paste-type vinyl chloride resin | 100 parts by weight |
| Trioctyl trimellitate | 70 parts by weight |
| Epoxidized soybean oil | 5 parts by weight |
| 4,4'-Isopropyldiphenylalkyl (C12 to C15) phosphite | 1 part by weight |
| Sample (Table 7) | 5 parts by weight |

Molding Method

The above components were sufficiently mixed to form a homogeneous mixture. Incorporated air was removed under a reduced pressure. The obtained compound was uniformly coated on a stainless steel sheet and heat pressing was carried out at a temperature of 230° C. under a pressure of 100 kg/cm² for 30 seconds to obtain a polyvinyl chloride sheet.

Method of Forming Composite Molded Body

A urethane-forming liquid was prepared by sufficiently mixing 100 parts by weight of a polyol component containing a foaming agent and a catalyst (RFX-262 supplied by Asahi Denka) with 50 parts by weight of a polyisocyanate component (RN-1300 supplied by Asahi Denka), and the urethane-forming liquid was cast in a thickness of 20 mm on the above-mentioned polyvinyl chloride sheet to obtain a polyvinyl chloride sheet/polyurethane foam composite body.

Test Methods

Heat Stability:

The above-mentioned composite molded article was placed in a gear type heat aging tester at a temperature In the present example, the heat stability of the soft polyvinyl chloride sheet and the prevention of the deterioration of the soft polyvinyl chloride sheet by the amine component migrating from the foamed urethane were tested.

From the test results shown in Table 7, it is understood that the powdery stabilizer composition of the present invention has an excellent amine resistance.

We claim:

1. A composition for stabilizing a chlorine-containing polymer, which comprises a zeolite stabilizer, calcium hydroxide or magnesium hydroxide, a metal soap stabilizer and perchloric acid as essential components.

2. A stabilizer composition as set forth in claim 1, which comprises 0.5 to 1.7 parts by weight of calcium hydroxide or magnesium hydroxide, 0.05 to 0.4 part by weight of the metal soap stabilizer and 0.1 to 0.4 part by weight of perchloric acid per part by weight of the zeolite stabilizer.

3. The composition of claim 1 wherein the zeolite stabilizer is selected from the group consisting of type A zeolite, type X zeolite, type Y zeolite, type T zeolite, chabazite, mordenite, erionite, and clinoptilplite.

4. The composition of claim 1 wherein the zeolite stabilizer is a type A zeolite.

5. The composition of claim 4 wherein the type A zeolite has a hydrochloric acid-capturing capacity of from 3 to 10 ml/g.

6. The composition of claim 5 wherein the type A zeolite comprises an alkali metal aluminosilicate, alkaline earth metal aluminosilicate or a mixed alkali metal-polyvalent metal aluminosilicate.

7. A process for the preparation of a stabilizer composition for a chlorine-containing polymer, which comprises mixing a zeolite stabilizer in the powdery state with fine particulate calcium hydroxide or magnesium hydroxide and then mixing the mixture with a metal soap stabilizer, or mixing the zeolite type stabilizer intimately with fine particulate calcium hydroxide or magnesium hydroxide and a metal soap stabilizer, and adding and mixing perchloric acid into the obtained powdery mixture.

8. A composition for stabilizing a chlorine-containing polymer, which comprises
   (i) a type A zeolite as main stabilizer component,
   (ii) 0.5 to 1.7 parts by weight, based on one part by weight of the zeolite, of calcium hydroxide or magnesium hydroxide, or mixture thereof,
   (iii) 0.05 to 0.4 part by weight based on one part by weight of the type A zeolite, of a metal soap, and
   (iv) 0.1 to 0.4 part by weight based on one part by weight of the type A zeolite, of perchloric acid.

9. The composition according to claim 8, wherein said type A zeolite (i) has a maximum pH value reduction gradient (Rmax) of −0.1 to −0.7 pH/meq HCl, based on 100 g of the zeolite, said Rmax being determined from the tangential line of the maximum gradient portion of the titration curve obtained by plotting the titration amount (milliequivalents) of HCl based on 100 g of the zeolite anhydride on the abscissa and the pH value of the system on the ordinate.

10. The composition according to claim 8, wherein said calcium hydroxide or magnesium hydroxide has a median diameter smaller than 20 μm based on the volume.

11. The composition according to claim 8, wherein said metal soap is a Ca, Ba, Mg or Zn salt of a higher fatty acid having 12 to 22 carbon atoms.

12. The composition according to claim 8 wherein the type A zeolite is Na zeolite, Ca zeolite or mixed Na-Ca zeolite.

13. A stabilized polyvinyl chloride resin composition which comprises polyvinyl chloride resin and a stabilizing effective amount of the composition of claim 1.

14. A method for stabilizing a chlorine-containing polymer against thermal degradation and discoloration which comprises uniformly dispersing a stabilizing effective amount of the composition of claim 1 into the chlorine-containing polymer.

15. A stabilized polyvinyl chloride resin composition which comprises polyvinyl chloride resin and a stabilizing effective amount of the composition of claim 8.

16. The stabilized polyvinyl chloride composition of claim 15 which further comprises a polyurethane.

* * * * *